United States Patent Office 3,195,980
Patented July 20, 1965

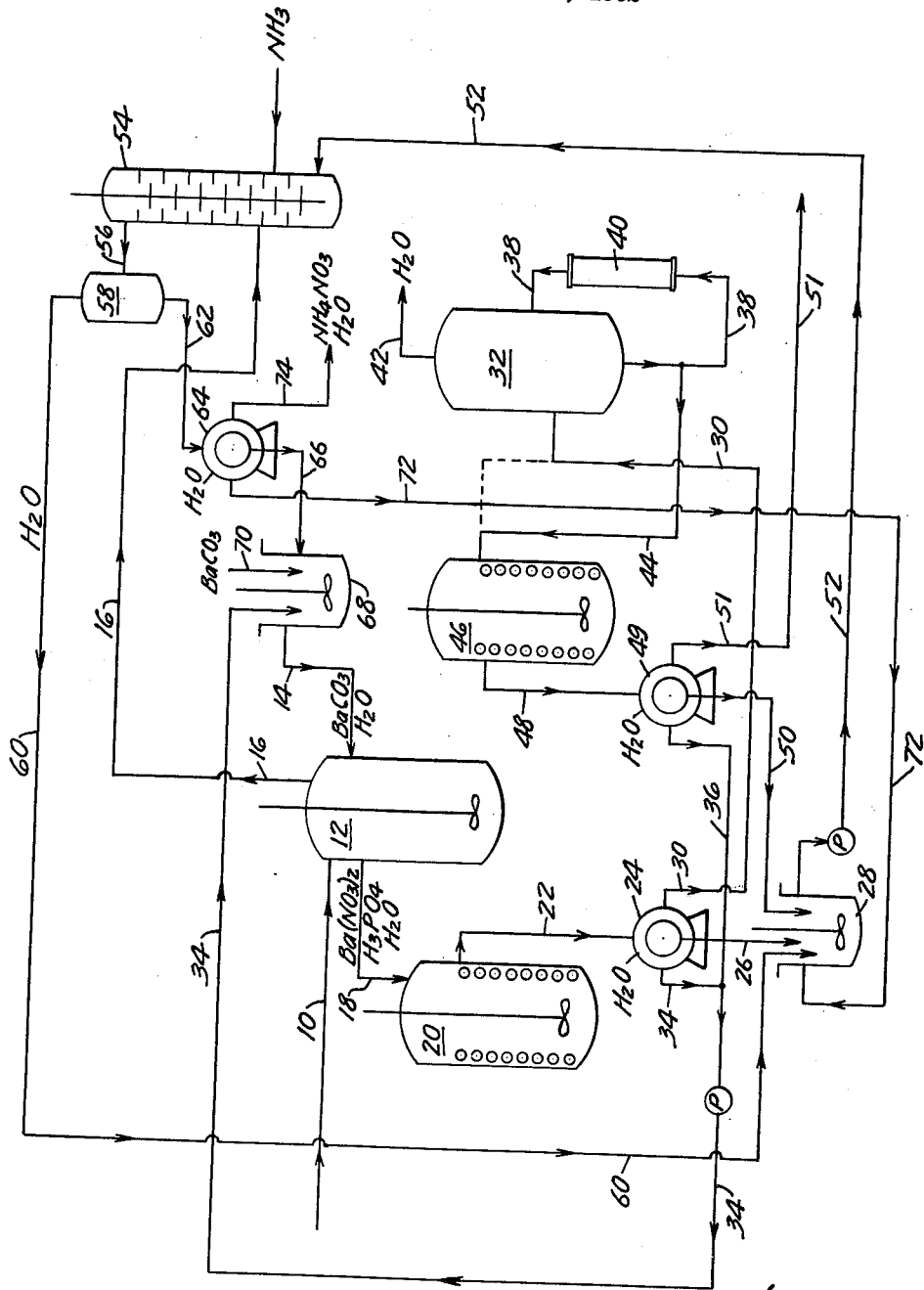

3,195,980
NITRATE REMOVAL FROM PHOSPHORIC ACID LIQUORS
David C. Gattiker and Gerhard J. Frohlich, St. Paul, Minn., assignors to St. Paul Ammonia Products, Inc., St. Paul, Minn., a corporation of Minnesota
Filed Mar. 30, 1962, Ser. No. 183,933
4 Claims. (Cl. 23—165)

This invention relates to the removal of nitrates from phosphoric acid liquors. In one aspect, this invention relates to a procedure for separating soluble nitrates from phosphoric acid liquors by the use of a barium compound as a nitrate precipitating agent. In another aspect, this invention relates to a nitrate removal precipitation cycle wherein the barium precipitating agent is regenerated for re-use in the system.

A common source of soluble nitrate containing phosphoric acid liquors is the liquor resulting from the acidulation of phosphate rock with nitric acid. The phosphoric acid mother liquor resulting from this acidulation, after separation of calcium nitrate, comprises essentially a phosphoric acid liquor containing nitric acid. Depending upon the treatment of the liquor, it may also contain in addition to, or in place of, the nitric acid, other dissolved nitrates, particularly calcium nitrate, but also potassium, sodium or other nitrate. In addition, these phosphoric acid liquors may also contain dissolved phosphates as for example potassium, sodium, calcium and ammonium phosphates.

Whether the source of such a phosphoric acid liquor is from nitric acid acidulation of phosphate rock or from some other derivation, this invention enables removal of soluble nitrates, particularly nitric acid, from the liquor by precipitating such dissolved nitrates as insoluble barium nitrate upon the addition of a barium precipitating agent to the liquor. This invention is particularly valuable as a means of separating nitric acid from a phosphoric acid liquor as such separation in accordance with this invention requires no vacuum distillation, the method commonly proposed to separate nitric acid from phosphoric acid liquors. Thus, no high temperatures are required in the refining of phosphoric acid from nitric acid acidulation of phosphate rock, which high temperatures magnify the corrosion potential of any hydrofluoric acid present in the liquor. As hydrofluoric acid is generally present as a by-product of the acidulation reaction with the phosphate rock, raising the liquor temperature for distillation greatly increases the equipment corrosion hazards created by the presence of the hydrofluoric acid. In this connection it is to be noted that construction materials which resist nitric acid and which are used in the construction of nitric acid acidulation apparatuses are prone to extremely rapid corrosion by hydrofluoric acid, hydrofluoric acid being a strong reducing acid whereas nitric acid is a strong oxidizing acid. Consequently, different materials of construction are generally utilized to handle each of these acids separately. Thus, any buildup of hydrofluoric acid in the system can phenomenally increase the corrosion rate of the system. The present invention provides a means for separating the nitrates without distillation.

It is preferred that the process of this invention comprises removing soluble nitrates from strongly acid phosphoric acid liquors by the addition of barium carbonate to the liquor thereby converting the soluble nitrates to barium nitrate and, while maintaining the strong acidity of the liquor, precipitating the barium nitrate from the liquor. The barium carbonate may be readily regenerated by reacting precipitated barium nitrate, after separation from the mother liquor, with ammonia and carbon dioxide, or with ammonium carbonate, this reaction yielding barium carbonate along with ammonium nitrate and water.

While barium nitrate has a solubility in water at 100° C. of about 26%, this solubility is greatly lessened in phosphoric acid and further decreases with decreasing temperatures. Thus, the barium nitrate separation from the phosphoric acid liquor at ambient temperatures, i.e., 15–35° C., precipitates the bulk of the barium nitrate from the liquor, leaving a barium nitrate concentration in the liquor of a maximum of possibly 3 to 5% (based on a phosphoric acid liquor having about 40 parts by weight phosphoric acid for each 60 parts water). This nitrate concentration can be readily further reduced by chilling the mother liquor to temperatures below ambient temperatures; and, by chilling to the range of 0° C. to about −10° C., the barium nitrate concentration is reduced to less than about 1% (based on a 40 wt. percent phosphoric acid liquor). This compares favorably with the residual nitrate concentration remaining after vacuum distillation of such a phosphoric acid liquor.

In order to prevent the precipitation of barium phosphates along with the barium nitrate, the acidity of the system must be maintained at a pH of about 2 and below. This can be maintained by the addition of free acid to the liquor. However, the preferred liquor is one composed primarily of phosphoric acid and nitric acid and acidity is maintained simply by the presence of the phosphoric acid itself. While the nitric acid which may be initially present gives an initially strongly acid pH value, since this nitric acid is destroyed by the precipitation of the barium nitrate, the acidity must be maintained by some other means than any nitric acid present.

Usually the phosphoric acid is sufficient to maintain the hydrogen ion concentration in the desired range. But, to prevent depletion of the phosphoric acid by the formation of phosphates, the amount of dissolved nitrates, and particularly nitrates of alkaline earth metals and similar metals which form relatively insoluble phosphates should be relatively small. The combining of alkaline earth metals such as calcium, strontium etc. and similar alkaline earth metals with phosphoric acid results in co-precipitation of alkaline earth phosphates along with barium nitrate unless the pH of the system is maintained in the very strong acid range. Consequently when from about 5–10% (of total liquor wt., not including barium compound addition) alkaline earth metal nitrate is present the pH should be maintained at and below about one (1) to prevent co-precipitation of barium, and other phosphates along with the barium nitrate. When such salts are present in lesser amounts the pH should not be permitted to rise above about 1.5.

The concentration of the phosphoric acid, based only on the phosphoric acid-water balance, in the soluble nitrate containing phosphoric acid starting liquor is not critical to the practice of the invention and the liquor may be quite dilute, as for example about 10% phosphoric acid concentration, or quite concentrated, for example up to about 50% phosphoric acid. However, to facilitate the barium carbonate reaction with the nitrates and to facilitate washing of clinging phosphoric acid from the barium nitrate precipitated from the liquor after the addition of the barium carbonate, the concentration of the liquor upon the addition of the barium carbonate thereto should be no more than about 50% phosphoric acid concentration. If it is higher than this, the phosphoric acid becomes quite viscous and difficult to remove from the barium nitrate filter cake, requiring progressively larger amounts of wash water to remove the phosphoric acid which clings to the precipitated barium nitrate as the phosphoric acid concentration of the liquor is increased.

It is quite desirable to reuse this wash water, which contains phosphoric acid, in the system. Thus it is preferred that a concentration of about 35–45% phosphoric acid (again based on the phosphoric acid-water balance only) be maintained with the barium carbonate addition. This provides an optimum balance of wash water recycling time, speed of the barium nitrate formation, and the maintenance of a continuous cyclic reaction with optimum processing advantages.

The amount of barium carbonate to be added to the phosphoric acid liquor for reaction with all of the nitrate ions in the liquor may be readily calculated for any given nitrate concentration and to assure completion of conversion to $Ba(NO_3)_2$ with time some excess may be maintained. However, if only a portion of the nitrate ions are to be removed, proportionately less barium carbonate may be used in the system. As the barium carbonate is a solid it is preferable to add it to the liquor in the form of an aqueous slurry. The water of this slurry may be used as a means to dilute more viscous phosphoric acids to the preferred 35–45% phosphoric acid concentration to enable more rapid barium nitrate formation and more efficient washing of residual phosphoric acid from precipitated barium nitrate.

When the barium nitrate containing phosphoric acid is to be chilled to temperatures below the freezing temperature of the water in the liquor, e.g., to temperature below 0° C., in the event it is not desired to have ice crystals separate out with the barium nitrate, the liquor may be first subjected to an evaporation step before the final barium nitrate separation step to reduce the water content and thus lower the ice forming temperature to a point below that at which the separation is to be carried out. Thus, with a 40% concentration phosphoric acid liquor, the freezing point of the liquor is about −20° C. Since a temperature of −10° C. provides a solubility of barium nitrate in 40% phosphoric acid solutions of less than 1%, i.e., about 0.8%, a highly acceptable figure for a refined phosphoric acid, as a practical consideration this is about the lowest separation temperature desirable. However, as noted before if the formation of ice crystals and their separation from the phosphoric acid is not objectionable along with the separation of the barium nitrate, if a more highly refined phosphoric acid is desired much lower temperatures can be used with or without further concentration of the acid.

The invention is further described with reference to the drawing which accompanies this application, the single figure of the drawing being a diagrammatic representation of the processing steps and equipment utilized in the practice of the invention when barium carbonate is the precipitating agent.

As noted in the drawing, phosphoric acid liquor which contains the soluble nitrates to be separated therefrom is fed through a feed line line 10 to reaction vessel 12 into which a barium carbonate slurry is introduced through barium carbonate inlet line 14. The reaction proceeds autogenously at room temperatures, but the temperatures may be raised if desired to speed the reaction. Carbon dioxide evolved in the reaction procedure is vented from the liquor through the vent line 16 whereas the barium nitrate containing phosphoric acid liquor proceeds from the reaction vessel through the line 18 to crystallizer 20 wherein the barium nitrate containing phosphoric acid liquor is reduced in temperature from its adiabatic reaction temperature to about ambient temperatures, i.e., 15–35° C., so that the bulk of the barium nitrate formed by the reaction is crystallized out of the liquor. The crystallized barium nitrate is washed free of residual phosphoric acid in the separator 24 and the wash water from this procedure is channelled into a main wash water line 34, which is used to make up barium carbonate slurry by a procedure described hereinafter. The thus cleansed barium nitrate is conducted through a chute or the like 26 into a barium nitrate slurrying vessel 28. The remaining phosphoric acid liquor following the separation at separator 24 passes through line 30 to an evaporator 32 wherein water is evaporated to lower the freezing point of the phosphoric acid liquor. The evaporator is equipped with a heater 40 through which the liquor is continuously circulated by means of line 38. Water flashed off the evaporator 32 leaves through the outlet line 42.

Line 44 branches off from recycling line 38 and continuously draws off concentrated liquor from which water has been evaporated and carries it to a crystallizer 46 wherein the temperature is reduced to achieve the desired degree of barium nitrate precipitation. In the event it is not necessary to concentrate the liquor to avoid the formation of ice in the crystallizer, or in the event no disadvantage is accrued by the passage of ice from the crystallizer along with barium nitrate, the evaporator 32 may be bypassed and line 30 continued as shown in dotted outline directly to the crystallizer.

The chilled liquor leaving the crystallizer 46 through line 48 now contains further precipitated barium nitrate which is conducted to a separator 49 wherein the barium nitrate is separated from the phosphoric acid. The separated phosphoric acid leaves the systems through line 51 and the barium nitrate, after washing to remove the residual phosphoric acid therefrom, is conducted by means of a chute, conveyor, or the like, 50 to the barium nitrate reslurrying tank 28. The wash water from this operation is conducted by means of line 36 to the main wash water line 34.

In the barium nitrate slurrying tank 28, water is added through lines 60 and 72 to slurry the barium nitrate for ease of transfer from the slurrying tank 28. The resulting slurry is pumped or otherwise conducted through line 52 to the reaction vessel 54 in which vessel ammonia and carbon dioxide are fed to convert the barium nitrate to barium carbonate. Some of the carbon dioxide fed into this portion of the system may be fed in through the overhead line 16 venting the main reaction vessel 12. The reaction vessel 54 is in effect a contactor wherein ammonia, carbon dioxide and barium nitrate slurry are brought into contact with one another. The reactions which occur in the contactor produce ammonium nitrate and barium carbonate in accordance with the simplified equations noted below:

$$2NH_3 + CO_2 + H_2O \rightarrow (NH_4)_2CO_3$$
$$Ba(NO_3)_2 + (NH_4)_2CO_3 \rightarrow BaCO_3 + 2NH_4NO_3$$

The heat generated by this reaction to produce barium carbonate and ammonium nitrate is considerable and some water is flashed off from this reaction in the auxiliary separator 58. This flashed off water is conducted through line 60 to the barium nitrate slurrying tank 28 as noted previously and serves to raise the temperature of the slurry increasing the barium nitrate dissolution therein. The remaining slurry, composed of an aqueous ammonium nitrate liquid carrying solid barium carbonate is conducted through line 62 to a separator 64 wherein the barium carbonate is separated from the aqueous ammonium nitrate. The aqueous ammonium nitrate leaves the system through line 74. The solid barium carbonate is washed with wash water, which wash water is then conducted through line 72 to the barium nitrate slurrying tank 28 as previously noted. The washed solid barium carbonate is then conducted by conveyor 66 or the like to the barium carbonate slurry makeup tank 68.

In the makeup tank 68, solid barium carbonate may be added as at 70 to make up the losses of barium carbonate through the various stages of the precipitation and this added barium carbonate along with the barium carbonate entering from conveyor 66 are slurried with the water from the main wash line 34 plus any additional water that may be necessary to bring the slurry up to the desired solids content whereby the concentration of the phosphoric acid liquor in the vessel 12 will be in the desired range. The resultant barium carbonate slurry is then conducted through the line 14 to the main reaction vessel 12 and the cycle is complete.

Following the described procedures, 2500 parts of an aqueous phosphoric acid-nitric acid liquor containing 40% phosphoric acid and 25% nitric acid were introduced into a reaction vessel to which was added 1820 parts of a barium carbonate slurry containing 980 parts of barium carbonate, the balance being water and residual phosphoric acid. The resultant mixture, providing a 35% phosphoric acid concentration, reacted autogenously under atmospheric pressure to form barium nitrate with the expulsion of 218 parts carbon dioxide.

The reaction mixture, which already contained a considerable amount of barium nitrate in solid form, was then reduced to a temperature of about 28° C. to precipitate out still more of the barium nitrate. In this manner about 85% of the total amount of barium nitrate formed crystallized out and was readily separated from the mother liquor. After separation, the barium nitrate crystals were washed with 690 parts of chilled wash water which was thereafter used as a portion of the water making up the barium carbonate slurry.

The phosphoric acid mother liquor after this initial barium nitrate separation then had evaporated from it about 604 parts of water. This concentrated the phosphoric acid mother liquor to about a 45% concentration so that its freezing point dropped to about −30° C. The resulting concentrated liquor was then cooled to −10° C. whereupon 183 parts of barium nitrate crystallized out. This barium nitrate was joined with the previously separated barium nitrate and the barium nitrate was slurried with water and the temperature raised to about 90° C. to facilitate as much solubility in water as possible. The resulting slurry was then reacted with 168 parts of ammonia, and 218 parts of carbon dioxide which had been previously vented from the initial reaction. In this manner, the barium nitrate was converted to barium carbonate and ammonium nitrate was formed. The heat of this reaction raised the temperature of the reaction mixture to about 112° C. Water, together with some traces of unreacted $CO_2$ and ammonia, was flashed off and returned to the barium nitrate slurrying tank to assist in raising the temperature and form up the slurry.

The barium carbonate formed by this reaction, now in a water and ammonium nitrate slurrying medium, was then separated out as a solid and the ammonium nitrate solution conducted out of the system. In this manner a 56% ammonium nitrate solution was formed with only very small traces of barium carbonate therein. Nine hundred and sixty seven parts of barium carbonate were recovered, which was washed with about 700 parts of water to remove any clinging mother liquor. The still moist solid barium carbonate, along with 13 parts of makeup barium carbonate, was then slurried up with 750 parts wash water recirculation stream from the first and second barium nitrate washings.

The 1000 parts phosphoric acid obtained by this procedure had about a 45% concentration and contained only 17 parts of barium nitrate; this resulting acid had a nitrogen concentration considerably less than 1%. There was also produced by the process 787 parts of useful ammonium nitrate.

While the invention has been described with reference to barium carbonate as the nitrate precipitating agent, other barium compounds can be used, particularly where no regeneration of the barium precipitating agent is desired. Thus, any acid decomposable barium compound free from phosphoric acid contaminating residue which decomposes in the acid medium to release barium ions can be used as the precipitating agent. Among such compounds are, for example, barium phosphates, barium oxides (including barium hydroxide), barium sulfides, barium containing ion exchange resins, etc. all of which release barium ions in strongly acid media while leaving readily separable residues which do not contaminate the phosphoric acid.

From the foregoing description, the invention will be apparent to those skilled in the art and what is claimed as new is as follows:

1. In a process for producing phosphoric acid by dissolving phosphate rock in excess nitric acid to produce an aqueous solution of 35–45 percent phosphoric acid containing excess nitric acid, the improvement comprising the steps of removing said excess nitric acid from said solution by reacting said nitric acid in said solution with barium carbonate and forming barium nitrate and carbon dioxide, removing barium nitrate crystals precipitated from said solution at ambient temperature, reducing the temperature of the solution to a range of about 0° C. to −10° C. and removing barium nitrate crystals precipitated from the solution at this reduced temperature, all of the foregoing steps being carried out while maintaining the pH of the solution at a maximum of about 2.

2. In a process for producing phosphoric acid which comprises dissolving phosphate rock in excess nitric acid to produce an aqueous solution of 35–45 percent phosphoric acid containing excess nitric acid, the improvement comprising the steps of removing excess nitric acid from said solution by reacting said nitric acid with barium carbonate to form barium nitrate and carbon dioxide, removing the barium nitrate precipitated from said solution at ambient temperature, reducing the temperature of said solution to a range of about 0° C. to −10° C. to precipitate remaining barium nitrate from said solution and removing the so precipitated barium nitrate, all of the foregoing steps being carried out while maintaining the pH of said solution no higher than about 2, and thereafter regenerating barium carbonate from said precipitated barium nitrate with ammonia and carbon dioxide.

3. In the process for producing phosphoric acid which comprises dissolving phosphate rock in excess nitric acid to form an aqueous solution of 10–50 percent phosphoric acid containing excess nitric acid and other dissolved nitrates, the improvement comprising the steps of removing said excess nitric acid and other dissolved nitrates from said solution by reacting said dissolved nitrates with barium carbonate and forming barium nitrate and carbonate dioxide, then removing barium nitrate precipitated from said solution, all of the foregoing steps being carried out while maintaining the pH of said solution at a maximum of about 2, and thereafter regenerating barium carbonate from said precipitated barium nitrate by reaction with ammonia and carbon dioxide.

4. The process of claim 3 wherein said ammonia and carbon dioxide are provided by ammonium carbonate.

References Cited by the Examiner

UNITED STATES PATENTS

| | | | |
|---|---|---|---|
| 1,273,824 | 7/18 | Cobellis | 23—102 |
| 1,676,556 | 7/28 | Howard | 23—165 |
| 1,834,455 | 12/31 | Johnson | 23—165 |
| 2,010,046 | 8/35 | Wilson | 23—102 |

MAURICE A. BRINDISI, *Primary Examiner.*